United States Patent
Sherman

[15] 3,664,292
[45] May 23, 1972

[54] MAGNETIC COMPASS TACK HEADING INDICATOR

[72] Inventor: Allen Butman Sherman, Pembroke, Mass.
[73] Assignee: E. S. Ritchie & Sons, Inc., Pembroke, Mass.
[22] Filed: Dec. 2, 1970
[21] Appl. No.: 94,285

[52] U.S. Cl..................................116/114, 33/222, 73/188
[51] Int. Cl. ...........................................G01d 21/00
[58] Field of Search..............33/222 R, 222 A, 222 B, 222 C, 33/222 CD, 222 E, 66; 73/180, 178, 188, 189; 116/129, 114

[56] References Cited
UNITED STATES PATENTS
215,403   5/1879   Severn......................................33/222
290,840   12/1883  Blakeslee..................................73/180
1,219,126 3/1917   Markkula..................................73/188
2,027,952 1/1936   Bandoly...................................33/222
2,060,766 11/1936  West, Jr...................................33/222
2,303,990 12/1942  Dietz.......................................33/222
3,477,131 11/1969  Warth et al................................33/66

Primary Examiner—Louis J. Capozi
Attorney—Chittick, Pfund, Birch, Samuels & Gauthier

[57] ABSTRACT

A navigational aid for use with a magnetic compass to set optimum tack headings to be taken when sailing upwind. The device fits over the transparent dome of a flat top or spherical compass and includes movable tack heading pointers and a bisecting wind heading pointer, the pointers all being rotatable about the compass card pivot point.

10 Claims, 4 Drawing Figures

PATENTED MAY 23 1972 3,664,292

INVENTOR
ALLEN BUTMAN SHERMAN

BY
Chittick, Pfund, Birch, Samuels & Gauthier

ATTORNEYS

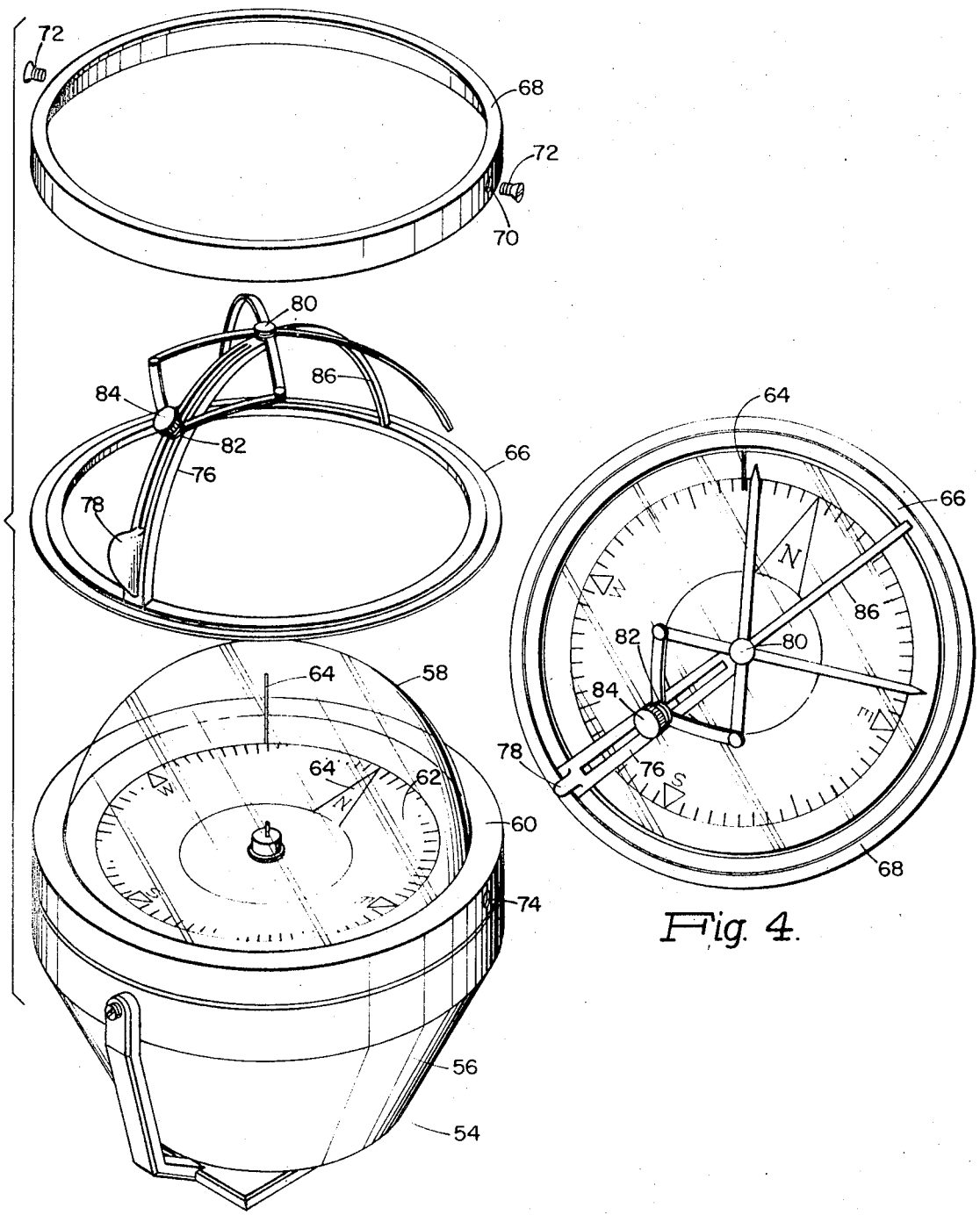

MAGNETIC COMPASS TACK HEADING INDICATOR

BACKGROUND OF THE INVENTION

In sailboat racing, it is necessary to tack when working upwind. Different boats have different capabilities for pointing close to the true wind. For example, some boats can point to within 35° of the wind, while others can do no better than 50°. Also, changing wind velocity and other weather conditions can alter this pointing capability on any particular boat.

In the past, a helmsman who comes about onto a tack heading usually selects the tack heading by watching the sails and by feel. Or, he does so with the help of his navigator who must quickly compute the optimum tack headings and relay them to the helmsman. In the heat of ocean racing, both procedures leave much to be desired.

SUMMARY OF THE INVENTION

This invention provides an indicating device for use with a magnetic compass on a sailing vessel. The device can also be used with the indicator dial of a remote reading compass or any other compass which indicates magnetic bearings. In its preferred embodiment, the device has a pair of tack heading pointers which are pivoted together above the compass card pivot point and which can be rotated either as a unit or to alter the angle formed therebetween. A wind heading pointer is provided which bisects the angle between the tack heading pointers.

When the vessel is working its way upward, and tacking is required, the helmsman need only to rotate the three pointers as a unit to set the optimum tack headings to be taken. Prior to the race, the helmsman will have pre-set the angle between the port and starboard pointers to reflect, for the prevailing weather conditions, how close the vessel can point into the true wind.

Prior to the start of the race, the helmsman rotates the three pointers as a unit with relation to the North-seeking arrow. If the boat is on a starboard or port tack, the appropriate tack pointer is aligned with the North arrow. Alternatively, if the boat is headed directly into the wind, the wind pointer is aligned with the North arrow. Then, as the starting line is approached, the helmsman can see at a glance what his heading for port or starboard should be as well as which end of the starting line will be favored. This one simple action is all that is necessary to set the optimum tack headings which are then taken by alternately coming about on the starboard tack until the North arrow aligns with the starboard tack pointer and then coming about on the port tack until the North arrow aligns with the port tack pointer.

If the wind shifts, the three pointers again must be rotated as a unit in the original manner. Also, if the wind velocity changes to a considerable extent, the helmsman may wish to adjust the angle between the two tack pointers.

BRIEF DESCRIPTION OF THE DRAWINGS

FIG. 3 is a perspective view of a domed magnetic compass supportably mounting an alternative tack heading indicator of this invention, the view showing, in exploded form, the compass, the indicator and the peripheral ring; and FIG. 4 is a top plan view of the elements shown in FIG. 3 after they have been assembled.

DESCRIPTION OF THE PREFERRED EMBODIMENT

Figures 1, 2:
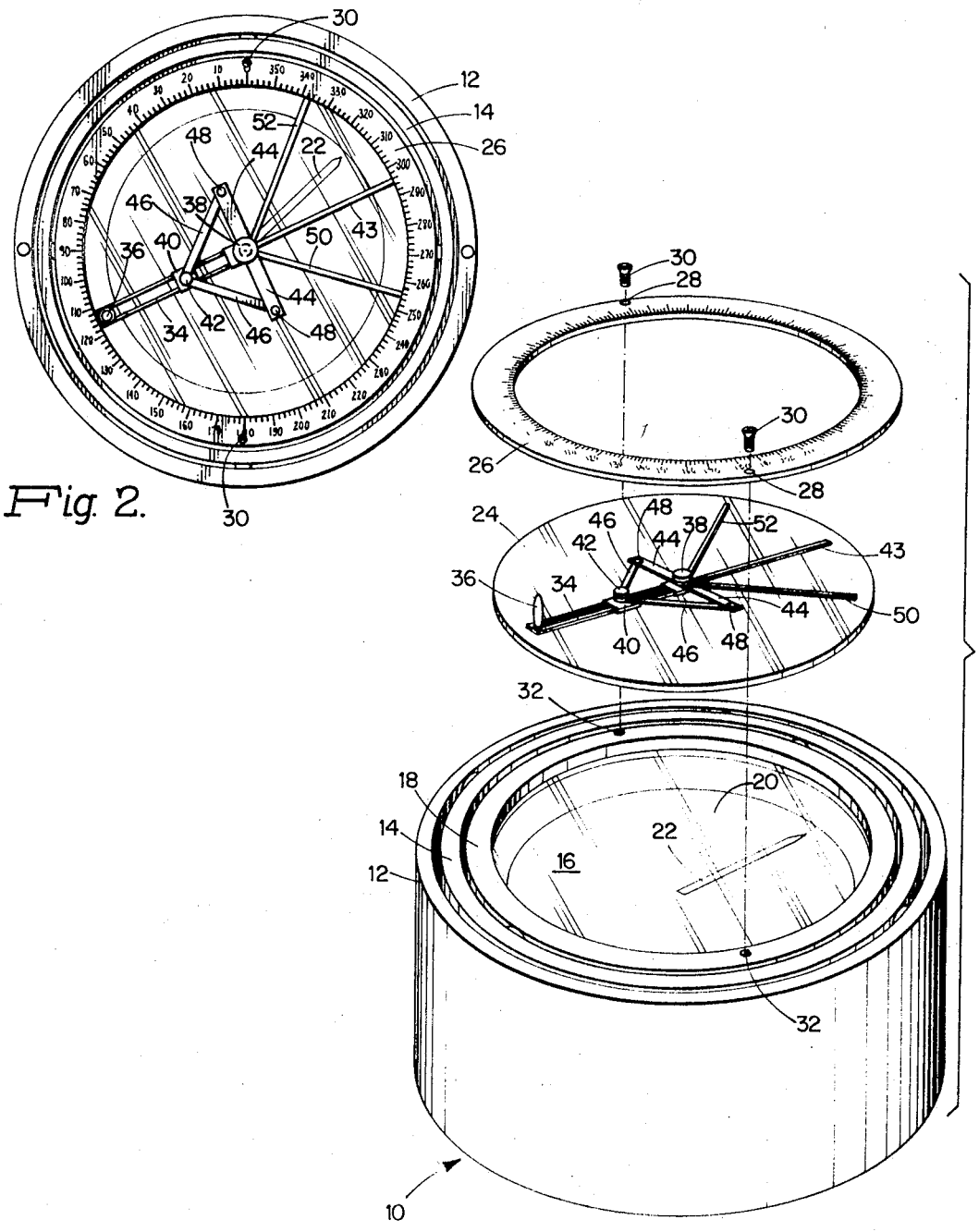
FIG. 1 is a perspective view of a flat topped magnetic compass supportably mounting the tack heading indicator of this invention, the view showing, in exploded form, the compass, the indicator and the peripheral ring.
FIG. 2 is a top plan view of the elements shown in FIG. 1 after they have been assembled.

The tack heading indicator of this invention is shown in one embodiment in FIGS. 1-2 for use with a flat topped magnetic compass and in an alternative embodiment in FIGS. 3-4 for use with a domed compass.

FIG. 1 shows a conventional magnetic compass 10 having a cylindrical housing 12, gimbals 14, a flat viewing glass 16, a retaining flange 18 and a pivoted card 20 having a North cardinal point or arrow 22. These elements are all conventional except that card 20 preferably is all black except for a white arrow 22.

A flat glass or plastic disk 24 has approximately the same diameter as flat viewing glass 16. The purpose of disk 24 is to provide a mounting support for the tack heading indicator apparatus and to provide a bearing plate which can rotate on retaining flange 18. Thus, disk 24 supports the tack heading indicator apparatus and is adapted to rotate or reposition the apparatus as a unit to set the desired tack headings.

A peripheral ring 26 is provided to slidably retain disk 24 on flange 18. Ring 26 has two or more screw holes 28 through which machine screws 30 are passed to be threadably secured in tapped holes 32 in flange 18. The screws and the holes are sized and located to ensure that disk 24 will be snugly retained while still being free to smoothly revolve when turned.

Periphral ring 26 has degree markings (or point markings) inscribed on its upper surface. Thus, the degree markings are fixed and arrow 22 revolves, in contrast to the conventional arrangement in which the degree markings are on the revolving card while the lubber line is fixed. Therefore, to permit bearings to be read directly, the degree markings on ring 26 numerically increase in the counter-clockwise direction instead of in the conventional clockwise direction.

The tack heading indicator apparatus includes a track 34 which is fixed to the upper surface of disk 24. At one end of track 34 is an upstanding member 36 or knob which can be manually gripped to revolve disk 24. At the other end of track 34 is a central pivot pin 38. A slide 40 has a slide pivot pin 42 mounted on its upper surface. Slide 40 straddles track 34 for slidable movement thereon. The upper end of slide pivot pin 42 forms an upstanding member shaped to be readily gripped by the helmsman's hand to move slide 40 in either direction along track 34. It will be appreciated that although two upstanding members 36 and 42 have been shown and described, knob 36 could be omitted and member 42 could be used both for pushing slide 40 along track 34 as well as for revolving disk 24.

A wind heading indicator 43 extends in alignment with track 34. When initially setting the indicator apparatus, knob 36 is turned to reposition the wind heading indicator so that it overlays the North arrow when the boat is headed directly into the wind.

A pair of central links 44 and a pair of slide links 46 form an articulated linkage. Central links 44 are pivoted together at their inner ends to central pivot pin 38. Slide links 46 are pivoted together at their inner ends to slide pivot pin 42. The outer ends of the central links and the slide links are pivoted together by outboard pivot pins 48.

Fixed to central links 44 are two pointers which pivot with their integral central links. Starboard tack heading indicator 50 is colored green to distinguish it from port tack heading indicator 52 which is colored red. Other differentiating indicia could also be applied to the pointers, e.g. using fluorescent paints for night sailing. It will be understood that the structural details of the articulated linkage arrangement can be modified in many ways to produce the same result. One obvious variation would be to lengthen central links 44, utilize them as the tack heading indicators and eliminate the indicators 50 and 52 which are shown in FIGS. 1 and 2. The important principle is that a simple and fast means must be provided to reposition the tack heading indicators relative to each other to alter the area between them to reflect how close the boat can point to the wind. This area is a geometrical sector and is formed by setting the desired angle between the port and starboard tack headings. This angle is usually between 70° and 100° meaning that the particular boat can point to within 35° and 50° of the wind.

To increase the angle between the tack heading indicators 50, 52, the helmsman pushes upstanding member 42 away from central pivot pin 38. To reduce the angle, he pushes upstanding member 42 toward central pivot pin 38. To reposition the indicators as a unit without altering the angle therebetween, the helmsman moves upstanding member 36 in the desired angular direction to set the tack headings. As previously stated, upstanding member 42 can be utilized to alter the angle between the tack heading indicators and to reposition them as a unit.

The tack heading indicator of this invention is shown in its alternative embodiment in FIGS. 3–4 for use with a spherical or hemispherical domed compass. FIG. 1 shows a conventional spherical compass 54 having a hollow housing 56, a domed viewing glass 58, a retaining flange 60 and a pivoted card 62 having a North cardinal point or arrow 64 and degree or point markings around its rim. A lubber line 64 is provided on or against dome 58. These elements are all conventional.

A ring mount 66 has approximately the same inner diameter as dome 58. The purpose of ring mount 66 is to provide a support for the tack heading indicator apparatus and to provide a bearing ring which can rotate on retaining flange 60. Thus, ring mount 66 supports the tack heading indicator apparatus and is adapted to rotate or reposition the apparatus as a unit to set the desired tack headings.

A peripheral ring 68 is provided to slidably retain ring mount 66 on retaining flange 60. Peripheral ring 68 has two or more screw holes 70 through which machine screws 72 are passed to be threadably secured in tapped holes 74 in flange 60. The screws and the holes are sized and located to ensure that ring mount 66 will be snugly retained while being free to smoothly revolve when turned.

Unlike peripheral ring 26 (shown in FIGS. 1–2), ring 68 has no degree markings inscribed on its upper surface. This is because the alternative tack heading indicator apparatus of FIGS. 3–4 is designed to be mounted as an accessory on a conventional domed compass which has a conventional card 62.

The alternative tack heading indicator apparatus includes an upwardly extending curved track 76 which is fixed at its lower end to ring mount 66. Adjacent the lower end of track 76 is an upstanding member 78 or knob which can be manually gripped to revolve ring mount 66. At the upper end of track 76 is a central pivot pin 80. A slide 82 has a slide pivot pin 84 mounted on its upper surface. Slide 82 engages track 76 for slidable movement thereon. The upper end of slide pivot pin 84 forms an upstanding member shaped to be readily gripped by the helmsman's hand to move slide 82 in either direction along track 76. It will be appreciated that although two upstanding members 78 and 84 have been shown and described, knob 78 could be omitted and member 84 could be used both for pushing slide 82 along track 76 as well as for revolving ring mount 66.

A wind heading indicator 86 extends in alignment with track 76 to form a semi-circle. Indicator 86 is rigidly joined at its lower end to ring mount 66.

It will be seen in FIGS. 3–4 that the alternative tack heading indicator apparatus has central links, slide links, outboard pivot pins and starboard and port tack heading indicators similar to those shown in FIGS. 1–2 with the exception that in the alternative embodiment the various components are curved to conform to the contour of dome 58. The operation of the alternative tack heading indicator apparatus is the same as that of the preferred tack heading indicator apparatus which has been previously described.

It will be appreciated that the flat topped compass shown in FIGS. 1–2 is designed to be sold as a complete unit while the tack heading indicator apparatus shown in FIGS. 3–4 is designed to be sold as an accessory without the compass. However, the principles of construction are the same and it would be in accordance with this invention to construct a domed compass incorporating a tack heading indicator apparatus designed to be sold as a complete unit as well as a tack heading indicator apparatus designed to be sold as an accessory for mounting on a flat topped compass.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. For use with a sailing vessel's conventional magnetic compass having a pivoted compass card within a housing and a glass cover retained by a flange, a device for indicating optimum tack headings comprising:

a. a pair of tack heading indicators movably mounted on the compass, said indicators being adapted to be moved to indicate various compass headings, b. said pair of tack heading indicators having distinguishing markings thereon indicating one to be the port tack heading indicator and the other to be the starboard tack heading indicator, c. first means operably associated with at least one of said pair of tack heading indicators for angularly repositioning said indicators relative to each other to alter the area of the geometrical sector formed by the compass card pivot point and said indicator pair to set the desired angle between the port and starboard tack headings, and d. second means operably associated with said pair of tack heading indicators for angularly repositioning said pair of indicators relative to the compass to set the desired tack headings, said second means acting to reposition said indicators as a unit leaving unaltered the area of the geometrical sector formed by the compass card pivot point and said indicator pair.

2. The device of claim 1 wherein said tack heading indicators comprise radially extending pointers pivoted together above the compass card pivot point.

3. The device of claim 2 wherein said port tack heading pointer is red and said starboard tack heading pointer is green.

4. The device of claim 1 further having a wind heading indicator mounted on the compass and adapted to be rotatably repositioned about the compass card pivot point.

5. The device of claim 2 further having a wind heading indicator comprising a radially extending pointer pivoted to said tack heading pointers, said wind heading indicator mounted to continuously bisect the angle formed between the tack heading pointers.

6. The device of claim 1 wherein said first means includes one upstanding member operably associated with at least one of said tack heading indicators, said upstanding member adapted to be moved manually to reposition at least one of said tack heading indicators.

7. The device of claim 2 wherein said first means includes a track mounted on the compass, an articulated linkage pivotally connected to said pair of indicators and slidably engaged in said track, and manual actuation means for sliding said linkage along said track to angularly reposition said indicators to each other.

8. The device of claim 1 wherein said second means includes one upstanding member operably associated with said pair of tack heading indicators, said upstanding member adapted to be moved manually to reposition said pair of tack heading indicators as a unit.

9. The device of claim 2 wherein said second means includes a support having a circular peripheral portion, said peripheral support portion slidably retained on the magnetic compass by the compass cover flange, said pivoted indicator pointers attached to said support, and manual actuation means for slidably rotating said support on the compass to reposition said pair of tack heading indicators as a unit.

10. The device of claim 1 wherein the compass cover flange has degree or point markings inscribed thereon and the compass card is entirely free from indicia except for the North Cardinal point.

* * * * *